United States Patent
Sato et al.

(10) Patent No.: US 7,195,825 B2
(45) Date of Patent: Mar. 27, 2007

(54) MULTI-LAYER SLIDING PART AND A METHOD FOR ITS MANUFACTURE

(75) Inventors: Issaku Sato, Tokyo (JP); Kenzou Tadokoro, Mouka (JP); Hideaki Tanibata, Mouka (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 137 days.

(21) Appl. No.: 10/644,965

(22) Filed: Aug. 21, 2003

(65) Prior Publication Data

US 2004/0091732 A1    May 13, 2004

(30) Foreign Application Priority Data

Aug. 23, 2002   (JP) ............... 2002-242759

(51) Int. Cl.
- *B32B 15/01*  (2006.01)
- *B22F 15/20*  (2006.01)
- *B22F 7/04*   (2006.01)
- *B22F 3/16*   (2006.01)
- *C22C 9/02*   (2006.01)

(52) U.S. Cl. ............ 428/674; 428/648; 428/565; 428/570; 428/677; 384/13; 384/463; 384/910; 419/8; 419/10; 419/23; 419/29; 419/31; 419/33; 419/38

(58) Field of Classification Search .......... 428/548, 428/565, 566, 570, 613, 677; 384/910, 13, 384/463; 419/10, 28, 29, 30, 64
See application file for complete search history.

(56) References Cited

U.S. PATENT DOCUMENTS

| | | | | |
|---|---|---|---|---|
| 4,233,254 A | * | 11/1980 | Sato et al. ............... | 264/37.29 |
| 4,240,830 A | * | 12/1980 | Lee .................... | 419/28 |
| 4,243,728 A | * | 1/1981 | Sato et al. ............ | 428/570 |
| 4,582,368 A | * | 4/1986 | Fujita et al. ........... | 384/13 |
| 4,917,509 A | | 4/1990 | Takano ................ | 384/275 |
| 5,298,336 A | | 3/1994 | Tanaka et al. .......... | 428/552 |
| 6,132,487 A | * | 10/2000 | Mori .................. | 75/247 |
| 6,492,033 B2 | | 12/2002 | Sato et al. ............ | 428/553 |
| 6,601,992 B2 | | 8/2003 | Tabuti et al. ........... | 384/420 |
| 6,613,453 B2 | * | 9/2003 | Sato et al. ............ | 428/676 |
| 2002/0142186 A1 | | 10/2002 | Sato et al. ............ | 428/676 |

FOREIGN PATENT DOCUMENTS

| | | | |
|---|---|---|---|
| JP | 55 134102 | | 10/1980 |
| JP | 55-134103 | * | 10/1980 |
| JP | 55 164050 | | 12/1980 |
| JP | 59-080521 | * | 5/1984 |
| JP | 63 282221 | | 11/1988 |
| JP | 63-282221 | * | 11/1988 |
| JP | 05-209207 | * | 8/1993 |
| JP | 05 248441 | | 9/1993 |
| JP | 11 131107 | | 5/1999 |

OTHER PUBLICATIONS

Kanezaki et al, 05-209207 english abstract, Title—Bearing, Publisher—Japanese Patent Abstracts.*
Katmitsuma et al. 63-282221 english abstract, Title—Manufacture of Composite Sintered Material, Publisher—Japanese Patent Abstracts.*
NDC KK, 59-080521 english abstract, Title—Lubricated bearing material production, Publisher—Japanese Patent.Abstracts.*
Kato et al, 55-134103 english abstract, Title—Copper Alloy Blank for Bearing, Publisher—Japanese Patent Abstracts.*

\* cited by examiner

*Primary Examiner*—Jennifer C. McNeil
*Assistant Examiner*—Jason L. Savage
(74) *Attorney, Agent, or Firm*—Michael Tobias

(57) ABSTRACT

A multi-layer sliding part is prepared by a process including mixing 1–50 parts by volume of a Cu-plated solid lubricant powder with 100 parts by volume of a Cu-based alloy powder comprising 5–20 mass % of Sn and a remainder of Cu to form a mixed powder, sintering the mixed powder in a reducing atmosphere to form a sintered mass, pulverizing the sintered mass to form a powder, dispersing the powder formed by pulverizing on a steel backing plate, and sintering the dispersed powder to bond grains of the dispersed powder to each other and to the backing plate.

16 Claims, 1 Drawing Sheet

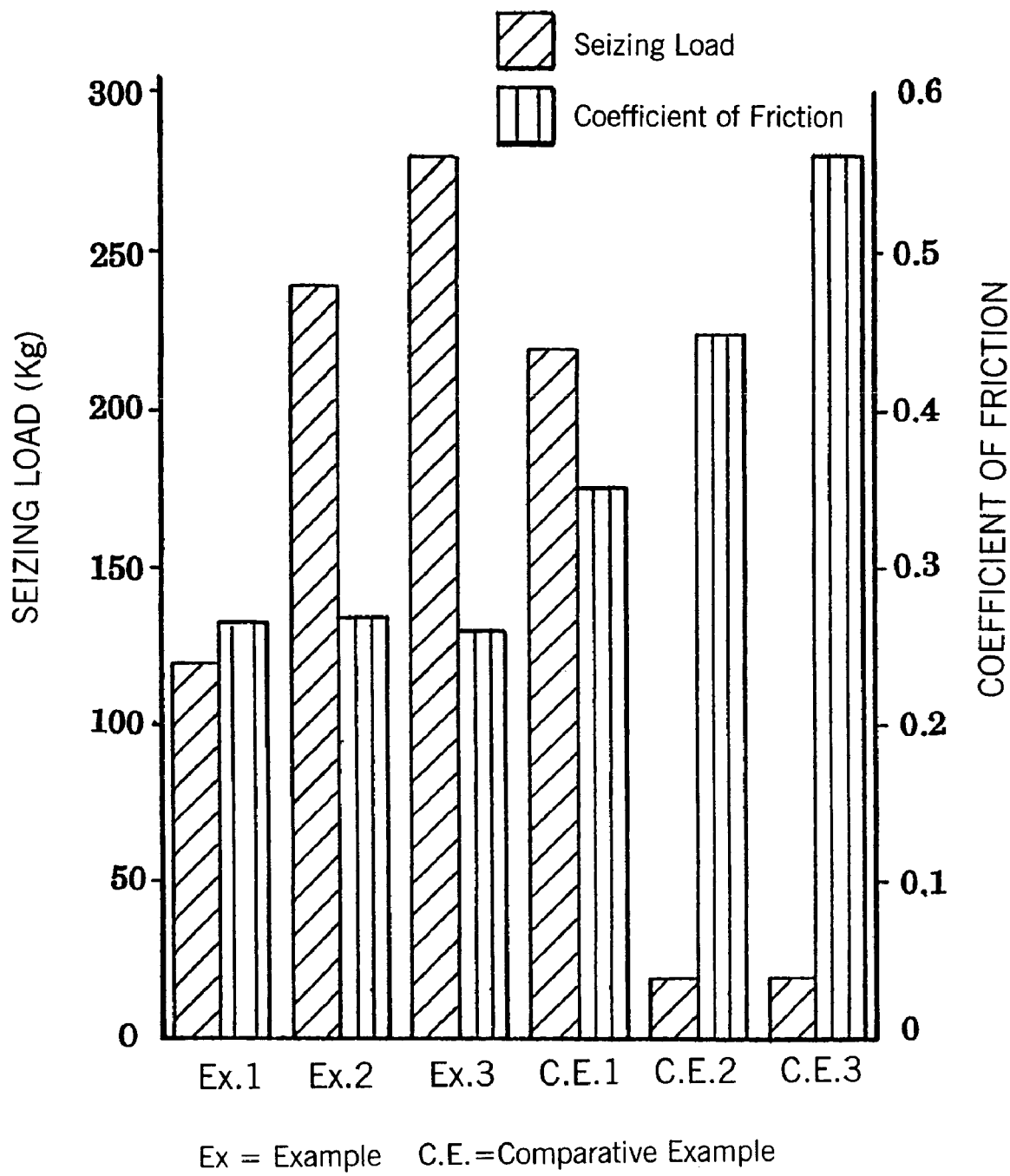

MULTI-LAYER SLIDING PART AND A METHOD FOR ITS MANUFACTURE

BACKGROUND OF THE INVENTION

1. Field of the Invention

This invention relates to a lead-free multi-layer sliding part and to a method for its manufacture. Examples of a sliding part according to the present invention are a cylindrical sliding member such as a bushing for use in a radial sliding bearing (also called a journal bearing) and a planar sliding member for use as a swash plate in a compressor, pump, or hydraulic motor.

2. Description of the Related Art

Sliding bearings are often made of a multi-layer sliding material comprising a backing plate of steel and a layer of a bearing metal bonded to the backing plate in order to increase the strength of the bearings so that they can withstand high loads.

For example, a bushing, which is a cylindrical sliding member used in a radial sliding bearing, is typically made of such a multi-layer sliding material. Such a bushing can withstand higher loads than a ball bearing or a roller bearing. Therefore, radial bearings using such a bushing are frequently used in portions on which a very high load is exerted, such as on the undercarriage of construction equipment such as bulldozers or power shovels to support rollers, or in the drive portions of automobiles in which a high load is applied and high speed rotation takes place.

A multi-layer sliding material is also used to form a planar sliding member which is subjected to high loads, such as a swash plate of a compressor or hydraulic motor, for example.

Methods for joining a bearing metal layer to a steel backing plate include the cladding method, the casting method, and the powder metallurgy method.

In the cladding method, the bonding strength between the bearing metal and the steel backing plate is relatively low, so when a high load is applied to a sliding bearing made from such a multi-layer material, there are cases in which the bearing metal layer peels off the steel backing plate.

In the casting method, a molten bearing metal is cast atop a steel backing plate. Although a bearing metal layer formed by the casting method has a strong bonding strength to the steel backing plate, this method is very troublesome to perform, and at the time of casting of the molten bearing metal, oxides can be included or shrinkage cavities can form, and these may have an adverse effect on bearing properties.

In the powder metallurgy method, a bearing metal in the form of a powder is dispersed on a steel backing plate and is sintered to join the grains of powder to each other and to the backing plate. A multi-layer material which is obtained by the powder metallurgy method has a strong bonding strength between the sintered bearing metal layer and the steel backing plate, and the sintering temperature can be made low, so there are few thermal effects on the steel backing plate or the bearing metal such as can occur with the casting method.

The materials which have been most commonly used to form a bearing metal layer of a multi-layer sliding bearing have been Cu-based alloys such as lead bronze, phosphor bronze, and high strength brass.

Lead bronze has good bearing properties, but it is a potential source of environmental pollution. When equipment containing a multi-layer bearing is discarded, the bearing is usually disposed of by burial underground, since the bearing metal layer and the steel backing plate cannot be readily separated from each other and so cannot be easily recycled. If a multi-layer bearing containing lead bronze which has been disposed of in a landfill is contacted by acid rain, lead may be dissolved from the bearing metal layer by the acid rain and may pollute underground water. If underground water which has been polluted by lead in this manner enters the water supply and is drunk for long periods by humans or livestock, the lead accumulates in the body and may cause lead poisoning. For this reason, the disposal of lead-containing materials is being increasingly regulated, and there is a trend in industry away from the use of lead-containing materials such as lead bronze for bearing metal layers of sliding bearings.

Phosphor bronze and high strength brass do not contain lead, but their sliding or bearing properties may not be adequate when they are subjected to high instantaneous loads, such as are applied to a swash plate of a compressor or hydraulic motor at the start of operation. As a result, these materials are more susceptible to seizing.

SUMMARY OF THE INVENTION

When a sliding part made of a multi-layer sliding material having a bearing metal layer bonded to a steel backing plate is manufactured by the powder metallurgy method, it is thought to be possible to improve the sliding properties of the bearing metal layer by incorporating a solid lubricant into the bearing metal layer. For this purpose, a powder of a bearing metal can be mixed with a powder of a solid lubricant, such as graphite or molybdenum disulfide, and the mixed powder is used to form the bearing metal layer by sintering.

However, such a sliding part having a sintered bearing metal layer containing a solid lubricant has the problem that the bearing metal layer may be cracked by an impact when subjected to a high load, thereby causing the bearing metal layer to peel off partly or completely or to wear out prematurely, leading to the occurrence of seizing.

JP-A 55-134102 (1980) describes forming a bearing by sintering of a mixture of metal powders and a Cu-plated solid lubricant powder. According to the technique disclosed therein, metal powders (such as Cu powder and Sn powder) which form a bearing metal are mixed with a Cu-plated solid lubricant powder (such as Cu-plated graphite powder or Cu-plated molybdenum disulfide powder). The powder mixture is subjected to cold or hot pressing in a mold and then sintered to form a Cu-based sintered bearing. The sintered body may be machined so as to form a bore and obtain a cylindrical bearing. However, this sintered bearing exhibits large variations in bearing properties, and if it is used as a bearing metal layer of a multi-layer bearing, its mechanical strength is too low for it to be used as a bushing for construction equipment on which a very high load is exerted. The use of Cu-plated graphite to form a sintered bearing material is also described in JP-A 05-248441 (1993).

The present inventors investigated the problems of conventional multi-layer sliding parts, such as sliding bearings, in order to provide a lead-free multi-layer sliding part in which these problems are eliminated or alleviated, and found the following.

The reason for the seizing which is encountered with a bearing made of phosphor bronze and high strength brass is that these bearing metals do not have good lubricity in the absence of a solid lubricant.

A bearing metal layer containing a solid lubricant formed by sintering a powder mixture of a bearing metal and a solid lubricant on a steel backing plate has improved lubricity, but it undergoes cracking and peeling because the particles of solid lubricant do not metallically bond to either the bearing metal or to the steel backing plate, so the bearing metal layer formed by sintering has poor bonding strength.

This problem can be alleviated to some extent by employing the technique disclosed in JP-A 55-134102 (1980), i.e., by plating the solid lubricant powder with copper and using the resulting Cu-plated solid lubricant powder to form a lubricant-containing bearing metal layer by sintering, since the Cu-plated solid lubricant powder can metallically bond to the bearing metal. However, according to the technique disclosed therein, various powders including a Cu powder, a Sn powder, and a Cu-plated solid lubricant powder are used to form a powder mixture to be sintered, and due to the differences in specific gravity of these powders, it is difficult to form a uniform mixture by mechanical mixing, and this results in a fluctuation in the bearing properties of the resulting sintered bearing layer. In addition, the mechanical strength of the sintered bearing metal layer is not sufficient to withstand a very high load. There is no bonding between the steel backing plate and the sintered bearing metal layer.

The present invention overcomes the above-described problems of conventional multi-layer sliding parts and provides a lead-free multi-layer sliding part having a bearing metal layer with a highly uniform structure and a strong bonding strength to a steel backing plate. In spite of not containing lead, the sliding part has excellent bearing properties comparable to or superior to those of conventional sliding parts employing lead bronze as a bearing metal. The multi-layer sliding part has a bearing metal layer which is strongly bonded to a backing plate and which does not undergo cracking or peeling when subjected to a high load. The multi-layer sliding part is thus suitable for uses involving the application of high loads and/or high operational speeds.

According to one form of the present invention, a multi-layer sliding part comprises a metal backing plate such as a steel plate and a bearing metal layer bonded to the backing plate. The bearing metal layer is formed by a method including sintering a mixture of 1–50 parts by volume of a Cu-plated solid lubricant powder with 100 parts by volume of a Cu-based alloy powder comprising 5–20 mass % of Sn and a remainder of Cu. In the sintered bearing metal layer, the Cu-plated solid lubricant powder and the Cu-based alloy powder are metallically bonded to each other, and these powders are secured to the metal backing plate by sintering.

According to another form of the present invention, a method of manufacturing a multi-layer sliding part comprises (a) mixing 1–50 parts by volume of a Cu-plated solid lubricant powder with 100 parts by volume of a Cu-based alloy powder comprising 5–20 mass % of Sn and a remainder of Cu to form a mixed powder, (b) sintering the mixed powder in a reducing atmosphere at 750–850° C. to form a sintered mass, (c) pulverizing the sintered mass to form a powder with a particle size of at most 300 μm, (d) dispersing the powder formed by pulverizing on a steel plate, (e) sintering the dispersed powder in a reducing atmosphere at 800–880° C. to bond grains of the dispersed powder to each other and to the steel plate to form a bearing metal layer on the steel plate, thereby forming a multi-layer material, (f) pressing the multi-layer material to densify the bearing metal layer, (g) annealing the multi-layer material after pressing in a reducing atmosphere at 840–880° C., and (h) pressing the annealed multi-layer material to increase the strength of the multi-layer material.

A multi-layer sliding part according to the present invention is not restricted to any particular form. For example, it can be in the form of a cylindrical sliding member such as a bushing for use in a radial sliding bearing (a journal bearing) or a planar sliding member for use as a swash plate in a compressor, pump, or hydraulic motor.

BRIEF DESCRIPTION OF THE DRAWINGS

The sole FIGURE is a graph showing bearing properties of examples of a multi-layer sliding part according to the present invention and comparative examples of a multi-layer sliding part.

DESCRIPTION OF PREFERRED EMBODIMENTS

A multi-layer sliding part according to the present invention includes a bearing metal layer and a metal backing plate bonded to the bearing metal layer. Typically, the backing plate is a steel plate.

The bearing metal layer is prepared by a method including mixing a Cu-plated solid lubricant powder with a Cu-based alloy comprising 5–20 mass % of Sn and a remainder of Cu followed by sintering the mixture. The Cu-based alloy may contain a minor amount of one or more additional alloying elements, and it is preferably a lead-free Cu-based alloy.

In contrast to the disclosure in JP-A 55-134102 (1980) in which a Cu powder and a Sn powder are mixed with a Cu-plated solid lubricant powder, a powder of a Cu—Sn alloy which has previously been prepared is mixed with a Cu-plated solid lubricant powder, and the resulting powder mixture is sintered on a metal backing plate, thereby forming a bearing metal layer which is bonded to the metal backing plate by sintering.

If the content of Sn in the Cu—Sn alloy is less than 5 mass %, a bearing metal layer having a sufficient hardness is not obtained, while if the Sn content exceeds 20 mass %, the bearing metal layer becomes brittle.

The solid lubricant used in the Cu-plated solid lubricant powder is preferably selected from graphite, molybdenum disulfide, tungsten disulfide, and mixtures of two or more of these. The plating of a solid lubricant powder with Cu may be performed by any convenient plating method, such as electroless plating or displacement plating (immersion plating).

The amount of the Cu-plated solid lubricant powder is preferably 1–50 parts by volume with respect to 100 parts by volume of the Cu—Sn alloy powder. If the amount of the solid lubricant powder is less than 1 part by volume, the resulting bearing metal layer does not have sufficient frictional properties, and seizing quickly occurs, while if the amount exceeds 50 parts by volume, the resulting bearing metal layer does not have sufficient mechanical strength.

After the Cu-plated solid lubricant powder and the Cu—Sn alloy powder are thoroughly mixed with each other, they are sintered in a reducing atmosphere preferably at 750–850° C. to form a sintered mass. If the sintering temperature is lower than 750° C., the bonding strength between powder grains is not sufficient. On the other hand, if the sintering temperature is higher than 850° C., the Cu which plates the solid lubricant diffuses into the Cu—Sn alloy powder and disappears from the surface, so the Cu—Sn alloy powder and the solid lubricant can no longer be bonded to each other, and they end up separating.

The sintered mass formed by sintering the Cu-plated solid lubricant powder and the Cu—Sn alloy powder is then pulverized by any convenient pulverizing apparatus, such as a mill, to form a powder. The Cu-plated solid lubricant and the Sn—Cu alloy powder have different specific gravities, and if they were simply mixed by a mixing machine, the Cu-plated solid lubricant would not be uniformly mixed with the Cu—Sn alloy powder. However, if the Cu-plated solid lubricant powder and Sn—Cu alloy powder are sintered to form a sintered mass and then pulverized, the solid lubricant is uniformly distributed. The particle size of the pulverized powder is preferably 300 μm or less. If the particle size of the pulverized powder is larger than 300 μm, the resulting bearing metal layer will have numerous voids, and the ability of the bearing metal layer to hold a shaft will be poor. More preferably, the particle diameter of the pulverized powder is approximately 100 μm.

The pulverized powder is then dispersed on a metal backing plate, such as a steel plate, and then sintered in a reducing atmosphere preferably at 800–880° C. in order to bond the grains of the powder to each other and to the backing plate. If the sintering temperature at this time is less than 800° C., the bonding strength of the grains of the alloy powder to each other and to the backing plate is not sufficient, while if the sintering temperature exceeds 880° C., iron in the steel backing plate and Cu in the powder form an intermetallic compound which decreases the bonding strength of the bearing metal layer to the backing plate.

The multi-layer material obtained by sintering the pulverized powder to the backing plate is then subjected to initial pressing to density the bearing metal layer. A pressing load of 150–250 tons is generally suitable. Pressing may be performed using any convenient pressing device, such as a press or rollers.

After initial pressing, the multi-layer material is annealed in a reducing atmosphere preferably at 840–880° C. The annealing reduces the hardness of the steel backing plate of the multi-layer material, which was excessively work hardened by the initial pressing, to a suitable level, and peeled portions formed during initial pressing are resintered to increase the bonding strength. Adequate annealing does not take place if the annealing temperature is less than 840° C., while if the annealing temperature is higher than 880° C., the hardness of the steel plate decreases too much, and the mechanical strength of the multi-layer material ends up decreasing.

After annealing, the multi-layer material is subjected to pressing a second time using any convenient pressing device, such as a press or rollers. The second pressing operation increases the hardness, which may have decreased too much during annealing, to a prescribed level and increases the mechanical strength. In addition, it reduces the thickness of the bearing metal layer to close to a desired thickness and makes it easier to perform subsequent mechanical working steps to form a multi-layer bearing.

If the sintered bearing metal layer is formed on both sides of the metal backing plate, as is sometimes the case with a planar bearing for a swash plate, all of the above-described steps, from the dispersion of the pulverized powder through the second pressing, may first be performed on one side of the metal backing plate, and then they may be all repeated on the other side of the backing plate. However, preferably, after the dispersion of the pulverized powder and the subsequent sintering are finished on one side of the backing plate, the same procedures are repeated on the other side thereof, and the subsequent steps of initial pressing, annealing, and second pressing are the performed on both sides simultaneously.

After the second pressing operation, the multi-layer material can be subjected to various working operations, such as polishing, machining, punching, bending, and joining, depending upon the intended use of the multi-layer material as a sliding part. For example, when the multi-layer material is to be formed into a journal bearing or bushing, after the second pressing operation, the multi-layer material is typically punched to form a generally rectangular blank of a suitable size. The blank is then bent into a cylindrical shape, with the bearing metal layer on the interior of the cylinder, and opposing ends of the blank are joined to each other by a suitable method, such as by forming a clinch-butt joint. Examples of procedures for forming a multi-layer material into a journal bearing are described in US 2002/0142186 A1, which is incorporated by reference. Examples of procedures for forming a multi-layer material into a swash plate are described in U.S. Pat. No. 6,492,033, which is also incorporated by reference.

EXAMPLES

The present invention will be further described by the following examples. The bearing metal powders and Cu-plated solid lubricant powders having the compositions shown in the following table were used to prepare a multi-layer sliding part in the form of a swash plate for a compressor for an automotive air conditioner.

|  | Composition (mass %) | | | | | | | | Cu—Sn (parts by volume) | Cu-plated graphite (parts by volume) | Cu-plated MoS$_2$ (parts by volume) | Remarks |
| --- | --- | --- | --- | --- | --- | --- | --- | --- | --- | --- | --- | --- |
|  | Cu | Sn | Pb | P | Zn | Fe | Al | Mn | | | | |
| Example 1 | rem | 10 | | | | | | | rem | 7 | | This invention |
| Example 2 | rem | 10 | | | | | | | rem | | 11 | This invention |
| Example 3 | rem | 10 | | | | | | | rem | 7 | 7 | This invention |
| Comparative Example 1 | rem | 10 | 10 | | | | | | | | | Lead bronze |
| Comparative Example 2 | rem | 10 | | 0.1 | | | | | | | | Phosphor bronze |
| Comparative Example 3 | rem | | | | 25 | 3 | 4 | 3 | | | | High strength brass |

Each swash plate included a backing plate in the form of a steel disk, and a bearing metal layer was formed on both sides of the disk. The swash plate was prepared by the following steps (a)–(h). Steps (d) and (e) were first performed on one side of the disk, and then they were repeated on the opposite side of the disk. Steps (f)–(h) were performed on both sides of the disk at the same time.

(a) Mixing: For each example, one or more Cu-plated solid lubricant powders in an amount shown in the table was mixed with 100 parts by volume of a Cu-based bearing metal powder having the composition shown in the table for that example.

(b) Initial sintering: The mixed powder obtained in step (a) was sintered by heating at 800° C. in a hydrogen-containing reducing atmosphere to form a sintered mass.

(c) Pulverizing: The sintered mass formed in step (b) was pulverized with a hammer mill to form a powder with a particle size of at most 200 μm.

(d) Dispersion: The pulverized powder from step (c) was uniformly dispersed to a thickness of 0.8 mm on a steel disk having a thickness of 5.0 mm and a diameter of 80 mm.

(e) Sintering: The steel plate on which the pulverized powder was dispersed was heated in the same reducing atmosphere as above at 860° C. to bond the powder grains to each other and to the steel disk and obtain a multi-layer material comprising a bearing metal layer and the steel disk.

(f) First pressing: The multi-layer material was pressed with a load of 200 tons by a press to densify the bearing metal layer.

(g) Annealing: The densified bearing metal layer was heated for 15 minutes at 860° C. in a hydrogen atmosphere in a heating furnace.

(h) Second pressing: The annealed multi-layer material was pressed with a load of 180 tons by a press to obtain a swash plate having a prescribed mechanical strength. The swash plate was then finished by machining with a precision lathe.

The seizing load (the load at which seizing occurred) and the coefficient of friction of the swash plates formed in this manner using the compositions shown in the table are illustrated in the figure. The seizing load of the swash plates was measured using a friction tester in a dry state. The coefficient of friction of the swash plates was measured using a thrust tester at a circumferential speed of 2.31 m/sec. As can be seen from the FIGURE, the multi-layer swash plates according to the examples of this invention had superior bearing properties compared to the comparative examples, which corresponded to conventional multi-layer swash plates.

A multi-layer sliding part according to the present invention has superior bearing properties compared to a conventional Cu-based multi-layer sliding part, and it has a sufficient mechanical strength to withstand a high load. Accordingly, the bearing properties of the sliding part can be stably maintained for long periods even when the sliding part is used as a sliding bearing for compressors or hydraulic equipment, or when it is used as a bushing for supporting rollers on the undercarriage of construction equipment, to which an extremely high load is applied. A method of manufacturing a multi-layer sliding part according to the present invention enables a solid lubricant powder to be uniformly distributed in a bearing metal layer, so sliding parts having good uniformity of properties can be obtained.

What is claimed is:

1. A multi-layer sliding part prepared by a method comprising mixing 1–50 parts by volume of a Cu-plated solid lubricant powder with 100 parts by volume of a Cu-based alloy powder comprising 5–20 mass % of Sn and a remainder of Cu to form a mixed powder, sintering the mixed powder in a reducing atmosphere to form a sintered mass, pulverizing the sintered mass to form a powder, dispersing the powder formed by pulverizing on a metal backing plate, and sintering the dispersed powder to bond grains of the dispersed powder to each other and to the backing plate.

2. A multi-layer sliding part as claimed in claim 1 wherein the metal backing plate comprises a steel plate.

3. A multi-layer sliding part as claimed in claim 1 wherein the solid lubricant of the Cu-plated solid lubricant powder is selected from graphite, molybdenum disulfide, tungsten disulfide, and mixtures of these.

4. A multi-layer sliding part as claimed in claim 1 wherein the Cu-based alloy powder consists of Cu and Sn.

5. A multi-layer sliding part as claimed in claim 1 wherein the backing plate has first and second sides, and a bearing metal layer is formed on both of the sides.

6. A swash plate for a compressor comprising a multi-layer sliding part as claimed in claim 1.

7. A method of manufacturing a multi-layer sliding part comprising:

(a) mixing 1–50 parts by volume of a Cu-plated solid lubricant powder with 100 parts by volume of a Cu-based alloy powder comprising 5–20 mass % of Sn and a remainder of Cu to form a mixed powder, (b) sintering the mixed powder in a reducing atmosphere to form a sintered mass, (c) pulverizing the sintered mass to form a powder, (d) dispersing the powder formed by pulverizing on a metal backing plate, (e) sintering the dispersed powder in a reducing atmosphere to bond grains of the dispersed powder to each other and to the metal backing plate to form a bearing metal layer on the metal backing plate, thereby forming a multi-layer material, (f) pressing the multi-layer material to densify the bearing metal layer, (g) annealing the multi-layer material after pressing in a reducing atmosphere, and (h) pressing the annealed multi-layer material to increase the strength of the multi-layer material.

8. A method as claimed in claim 7 wherein the solid lubricant of the Cu-plated solid lubricant powder is selected from graphite, molybdenum disulfide, tungsten disulfide, and mixtures of these.

9. A method as claimed in claim 7 wherein the sintering in step (b) is carried out at a temperature of 750–850° C.

10. A method as claimed in claim 7 wherein the sintering in step (e) is carried out at a temperature of 800–880° C.

11. A method as claimed in claim 7 wherein the annealing in step (g) is carried out at a temperature of 840–880° C.

12. A method as claimed in claim 7 including pulverizing the sintered mass in step (c) to form a powder with a particle size of at most 300 μm.

13. A method as clamed in claim 7 including pulverizing the sintered mass in step (c) to form a powder with a particle size of at most 100 μm.

14. A method as claimed in claim 7 wherein the backing plate comprises a steel plate.

15. A method as claimed in claim 7 wherein the backing plate has first and second sides, the method including forming a bearing metal layer on both of the sides.

16. A method of manufacturing a multi-layer sliding part comprising:

(a) mixing 1–50 parts by volume of a Cu-plated solid lubricant powder with 100 parts by volume of a Cu-based alloy powder comprising 5–20 mass % of Sn and a remainder of Cu to form a mixed powder,
(b) sintering the mixed powder to form a sintered mass,
(c) pulverizing the sintered mass to form a powder,
(d) dispersing the powder formed by pulverizing on a metal backing plate, and
(e) sintering the dispersed powder to bond grains of the dispersed powder to each other and to the metal backing plate to form a bearing metal layer on the metal backing plate, thereby forming a multi-layer material.

* * * * *